Nov. 11, 1969   M. A. M. BAKKER ET AL   3,478,243
MERCURY DISPENSING DEVICE FOR AN ELECTRIC DISCHARGE TUBE
Original Filed Oct. 27, 1966
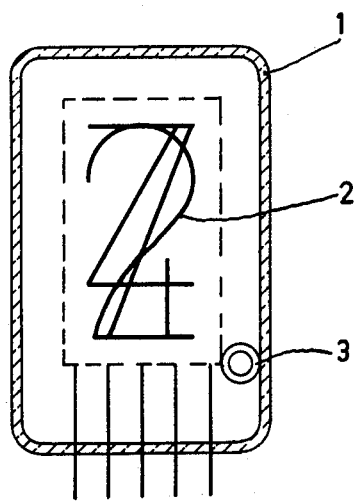
INVENTORS
MARTINUS A.M. BAKKER
MARIA A.A. COLLARIS
JOHANNES CHR. DURAN
BY
AGENT United States Patent Office 3,478,243
Patented Nov. 11, 1969

3,478,243
MERCURY DISPENSING DEVICE FOR AN
ELECTRIC DISCHARGE TUBE
Martinus Antonius Maria Bakker, Maria Antonius
Alphonsus Andreas Collaris, and Johannes Christ-
iaan Duran, Emmasingel, Eindhoven, Netherlands,
assignors, by mesne assignments, to U.S. Philips
Corporation, New York, N.Y., a corporation of
Delaware
Continuation of application Ser. No. 589,876, Oct. 27,
1966. This application Jan. 27, 1969, Ser. No. 797,356
Claims priority, application Netherlands, Nov. 16, 1965,
6514835
Int. Cl. H01j 19/68, 19/70; H01k 1/52
U.S. Cl. 313—174        5 Claims

ABSTRACT OF THE DISCLOSURE

A device for dispensing an accurately determined quantity of mercury into an electric discharge tube is disclosed in which the mercury amalgam is carried on a support and is covered by a layer which forms no amalgam with mercury so that when heated, the mercury is released and not reabsorbed when cooled.

CROSS REFERENCES TO RELATED APPLICATIONS

This application is a continuation of application Ser. No. 589,876, filed Oct. 27, 1966, now abandoned.

The invention relates to a method of manufacturing a device for dispensing a quantity of mercury, to such a device obtained by this method, and to a discharge tube provided with such a device.

It is common knowledge that mercury can be introduced into discharge tubes in the form of mercury compounds or mercury amalgams. Many methods have been described for introducing mercury in the form of mercury compounds. Such methods generally have the disadvantage that the mercury compounds must be reduced, which process involves a harmful development of gas. Less accurate methods are known for introducing mercury in the form of amalgams.

The principal object of the invention is to provide a method of manufacturing a device for dispensing accurately determined quantities of mercury which can be introduced into a discharge tube without the manufacture of the discharge tube involving unfavorable secondary phenomena.

This and further objects of the invention will appear as the specification progresses.

According to the invention, in a method of manufacturing a device for dispensing mercury in an electric discharge tube, an accurately determined quantity of a metal amalgamating with mercury is deposited on a support which does not amalgamate with mercury, whereupon the assembly is subjected to the action of mercury vapor until saturation is attained. The support, thus treated, is then coated with an uninterrupted layer of a metal which does not amalgamate with mercury. This mercury-dispensing device then is positioned within a discharge tube and is heated, after the exhaust tube of the latter has been sealed, to such a high temperature that the mercury is released from the amalgam.

In accordance with the method of the invention, a mercury-dispensing device is obtained which gives off mercury only at a temperature which is considerably higher than the highest temperature occurring in the usual heating and pumping processes. Moreover, after cooling, this mercury-dispensing device does not absorb the mercury again so that the whole quantity of mercury supplied to the discharge tube by means of the mercury-dispensing device is, in fact, available for the intended purpose.

In a mercury-dispensing device in accordance with the invention, the non-amalgamating support preferably consists of iron or nickel, the amalgamating layer of copper, silver or gold and the coating layer of nickel.

The invention will now be described more fully with reference to the drawing in which the sole figure is a sectional view of a tube employing a mercury-dispensing device according to the invention.

In the figure, reference numeral 1 designates a glow-discharge tube in which a plurality of character-shaped cathodes 2 are arranged which can be arbitrarily switched on. In the proximity of the bottom of the tube there is arranged an iron ring 3 of 7 mms. diameter, 1 mm. width and 0.5 mm. thickness. Before it is introduced into the discharge tube, this ring is nickel-plated and then coated by electrodeposition with 12 mgs. of silver. A plurality of these rings were simultaneously suspended over a mercury bath of 200° C., each ring absorbing 3.5 mgs. of mercury. After cooling, the ring was coated by electrodeposition with a gold layer of 1 to 2 microns thickness in order to improve the adhesion of the nickel layer which was subsequently applied in a quantity of 9 mgs. and which had a thickness of 22 microns. For 15 minutes, such rings did not decrease in weight due to loss of mercury at a temperature between 400° C. and 45° C.

After the ring was mounted in the tube, the tube was exhausted and rare gas introduced, the exhaust tube was sealed and the ring heated at a temperature of 600° C. for 1 minute. The mercury was released quantitatively and the ring did not absorb the mercury either during the life of this tube of many thousands of hours.

While the invention has been described with reference to a particular embodiment and application thereof, other modifications will be apparent to those skilled in this art without departing from the spirit and scope of the invention as defined in the appended claims.

What is claimed is:

1. A device for dispensing an accurate quantity of mercury into an electric discharge tube comprising a support which does not form a mercury amalgam, a layer on said support of a metal amalgamated and saturated with mercury, and a continuous outer covering layer surrounding said support, said covering layer consisting of a metal which does not amalgamate with mercury but which is pervious to mercury released by heating and prevents reabsorption of mercury during cooling.

2. A device as claimed in claim 1 in which the support is iron.

3. A device as claimed in claim 2 in which the outer covering layer consists of nickel.

4. A device as claimed in claim 3 in which the metal forming the mercury amalgam is selected from the group consisting of copper, silver and gold.

5. A device as claimed in claim 4 in which a gold layer is provided between the mercury amalgamated metal layer and the outer nickel layer to improve adhesion therebetween.

References Cited

UNITED STATES PATENTS

| | | | |
|---|---|---|---|
| 3,366,820 | 1/1968 | Wolfe | 313—174 X |
| 2,288,253 | 6/1942 | Reuter | 206—0.4 X |
| 2,907,672 | 10/1959 | Irland et al. | 117—107 |
| 3,263,111 | 7/1966 | Doering | 206—0.4 |
| 3,318,649 | 5/1967 | Keller et al. | 206—0.4 |

JAMES W. LAWRENCE, Primary Examiner

RAYMOND F. HOSSFELD, Assistant Examiner

U.S. Cl. X.R.

206—.4